(12) United States Patent
Jain et al.

(10) Patent No.: US 12,250,111 B2
(45) Date of Patent: Mar. 11, 2025

(54) APPARATUS AND METHOD FOR CENTRALIZED FAULT MONITORING

(71) Applicant: Rakuten Symphony, Inc., Tokyo (JP)

(72) Inventors: Amber Jain, Indore (IN); Nimit Agrawal, Indore (IN); Hemant Gupta, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/918,599

(22) PCT Filed: May 10, 2022

(86) PCT No.: PCT/US2022/028471
§ 371 (c)(1),
(2) Date: Oct. 13, 2022

(87) PCT Pub. No.: WO2023/219603
PCT Pub. Date: Nov. 16, 2023

(65) Prior Publication Data
US 2024/0223441 A1 Jul. 4, 2024

(51) Int. Cl.
*H04L 41/069* (2022.01)
*H04L 41/0686* (2022.01)
*H04L 43/0817* (2022.01)

(52) U.S. Cl.
CPC ........ *H04L 41/0686* (2013.01); *H04L 41/069* (2013.01); *H04L 43/0817* (2013.01)

(58) Field of Classification Search
None
See application file for complete search history.

(56) References Cited

U.S. PATENT DOCUMENTS

| 6,611,867 | B1 | 8/2003 | Bowman-Amuah |
| 2002/0170002 | A1 | 11/2002 | Steinberg et al. |
| 2008/0049775 | A1 | 2/2008 | Morrill et al. |
| 2020/0272923 | A1 | 8/2020 | Banerjee et al. |
| 2021/0058323 | A1* | 2/2021 | Thanneeru .......... H04L 12/2856 |
| 2021/0263779 | A1* | 8/2021 | Haghighat ............ G06F 9/5061 |
| 2023/0209105 | A1* | 6/2023 | Kozak .............. H04N 21/25841 725/93 |

OTHER PUBLICATIONS

International Search Report of PCT/US2022/028471 dated Sep. 12, 2022 [PCT/ISA/210].
Written Opinion of PCT/US2022/028471 dated Sep. 12, 2022 [PCT/ISA/237].

* cited by examiner

*Primary Examiner* — June Sison
(74) *Attorney, Agent, or Firm* — Sughrue Mion, PLLC

(57) ABSTRACT

A method for cloud-native centralized fault monitoring in a telecommunication network, the method performed by a processor and comprising receiving one or more raw fault messages associated with one or more respective network devices, wherein the one or more raw fault messages are received using one or more network protocols associated with the one or more respective network devices; identifying fault information from the one or more raw fault messages; enriching the fault information based on continuously processing the fault information and additional contextual information; and storing the enriched fault information in a plurality of databases, wherein a first subset of the enriched fault information is stored in a first database and a second subset of the enriched fault information is stored in a second database.

18 Claims, 7 Drawing Sheets

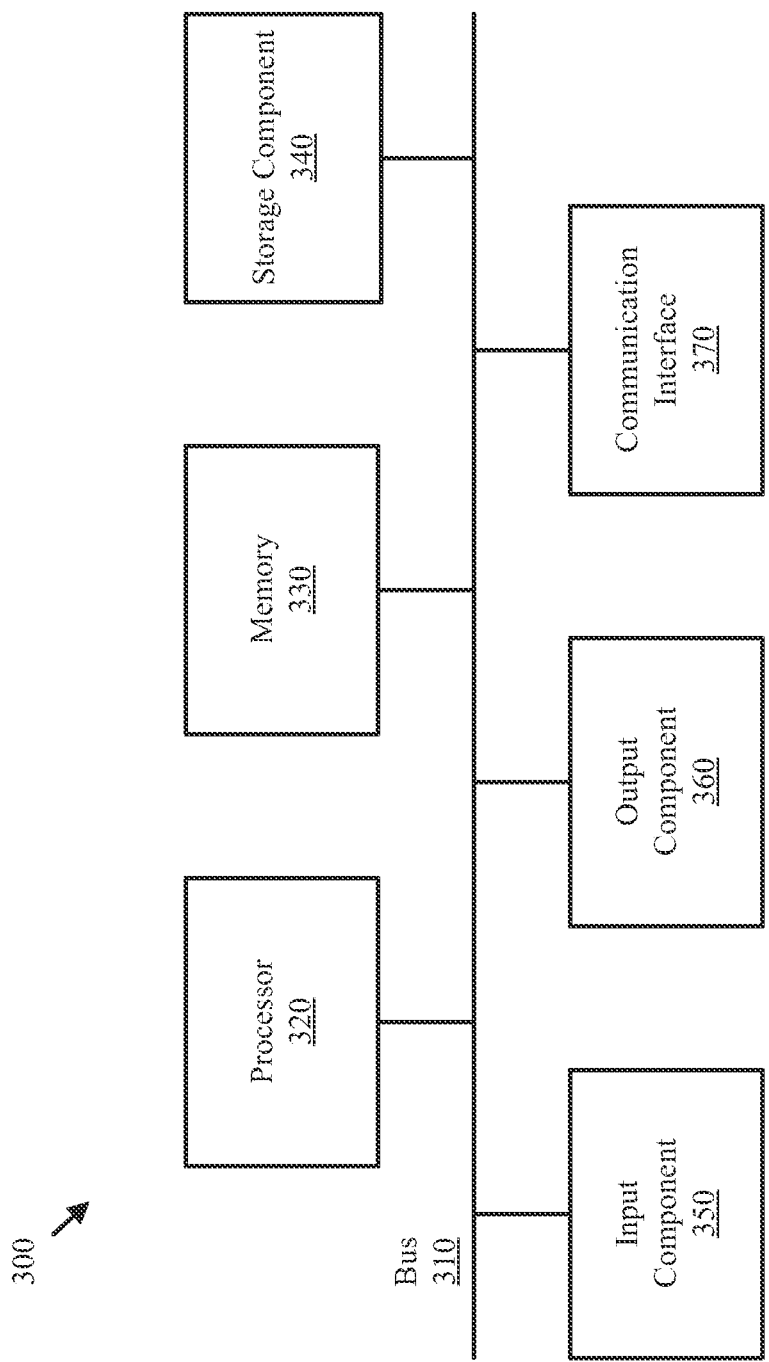

APPARATUS AND METHOD FOR CENTRALIZED FAULT MONITORING

CROSS REFERENCE TO RELATED APPLICATIONS

This application is a National Stage of International Application No. PCT/US2022/028471, filed May 10, 2022.

BACKGROUND

Fault monitoring and management in a telecommunication network are critical to ensure smooth and continuous provision of services to users. Significant parts of the telecommunication networks and services are becoming cloud-based, prompting a need for cloud-native fault monitoring and management systems that are easy to manage and scale. Additionally, traditional fault monitoring and management systems have distinct processes for different vendors, or devices that utilize different message, network, and communication protocols. With an increase in the types of network devices and an increase in vendors of network devices, traditional fault monitoring and management systems that have distinct processes for different protocols fail to scale up and become inefficient to manage. Integration of new protocols or devices can be very hard. Therefore, fault monitoring and management systems that are protocol agnostic and cloud native are required to support the changing and growing needs of modern telecommunication networks.

SUMMARY

According to one or more embodiments, a method for cloud-native centralized fault monitoring in a telecommunication network, the method executed by one or more processors in an operation support system of the telecommunication network, the method comprising: receiving one or more raw fault messages associated with one or more respective network devices, wherein the one or more raw fault messages are received using one or more network protocols associated with the one or more respective network devices; identifying fault information from the one or more raw fault messages; enriching the fault information based on continuously processing the fault information and additional contextual information; and storing the enriched fault information in a plurality of databases, wherein a first subset of the enriched fault information is stored in a first database and a second subset of the enriched fault information is stored in a second database.

Identifying the fault information may include integrating the one or more respective network devices; and storing the one or more raw fault messages in an event storing framework for continuous stream processing.

The integrating may include determining a type of network device based on the identified fault information; adding the type of network device to an inventory of network devices; and registering an alarm library of the type of network device to an alarm inventory.

The identified fault information may include at least one of a network device IP address, a network device identification number, a network device vendor ID, or a type of network device.

The additional contextual information may include at least one of a device status, a network domain, a geographic location, a radio-frequency cluster, a vendor id, or an entity management system id based on a device identification number; and planned event information indicating outages or maintenance events in the telecommunication network.

The enriching may include at least one of mapping a respective raw fault message from the one or more raw fault messages to a specific network device from the one or more respective network devices; or mapping the respective raw fault message from the one or more raw fault messages to the specific network device from the one or more respective network devices and a specific alarm from an alarm inventory.

The method may further include generating one or more user reports based on the first subset of the enriched fault information and the second subset of the enriched fault information, wherein the one or more user reports is one of a customizable dashboard, a trend report, or a map-based report.

A first raw fault message from the one or more raw fault messages may be received using a first network protocol from the one or more network protocols and a second raw fault message from the one or more raw fault messages may be received using a second network protocol from the one or more network protocols, and wherein the first network protocol may be different than the second network protocol.

The one or more raw fault messages associated with the one or more respective network devices may be received via one or more entity management systems.

The first subset of the enriched fault information may include recent fault event information, and wherein the first database may be a relational database.

The first database may be organized based on vendor ID and entity management system ID.

The second subset of the enriched fault information may include historical fault event information, and wherein the second database may be a non-relational database.

The method may further include based on the first subset of the enriched fault information being stored in the first database longer than a history threshold, moving the first subset of the enriched fault information from the first database to the second database.

According to one or more embodiments, an apparatus for cloud-native centralized fault monitoring in a telecommunication network may include a memory configured to store instructions; and one or more processors configured to execute the instructions to: receive one or more raw fault messages associated with one or more respective network devices, wherein the one or more raw fault messages are received using one or more network protocols associated with the one or more respective network devices; identify fault information from the one or more raw fault messages; enrich the fault information based on continuously processing the fault information and additional contextual information; and store the enriched fault information in a plurality of databases, wherein a first subset of the enriched fault information is stored in a first database and a second subset of the enriched fault information is stored in a second database.

According to one or more embodiments, a non-transitory computer-readable medium storing instructions may be provided. The instructions may include one or more instructions that, when executed by one or more processors of a cloud-native centralized fault monitoring in a telecommunication network, cause the one or more processors to receive one or more raw fault messages associated with one or more respective network devices, wherein the one or more raw fault messages are received using one or more network protocols associated with the one or more respective network devices; identify fault information from the one or more raw fault messages; enrich the fault information based on continuously processing the fault information and additional contextual information; and store the enriched fault information in a plurality of databases, wherein a first subset of the enriched fault information is stored in a first database and a second subset of the enriched fault information is stored in a second database.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 3 is a diagram of example components of one or more devices of FIG. 2, according to embodiments;

DETAILED DESCRIPTION

Figure 1:
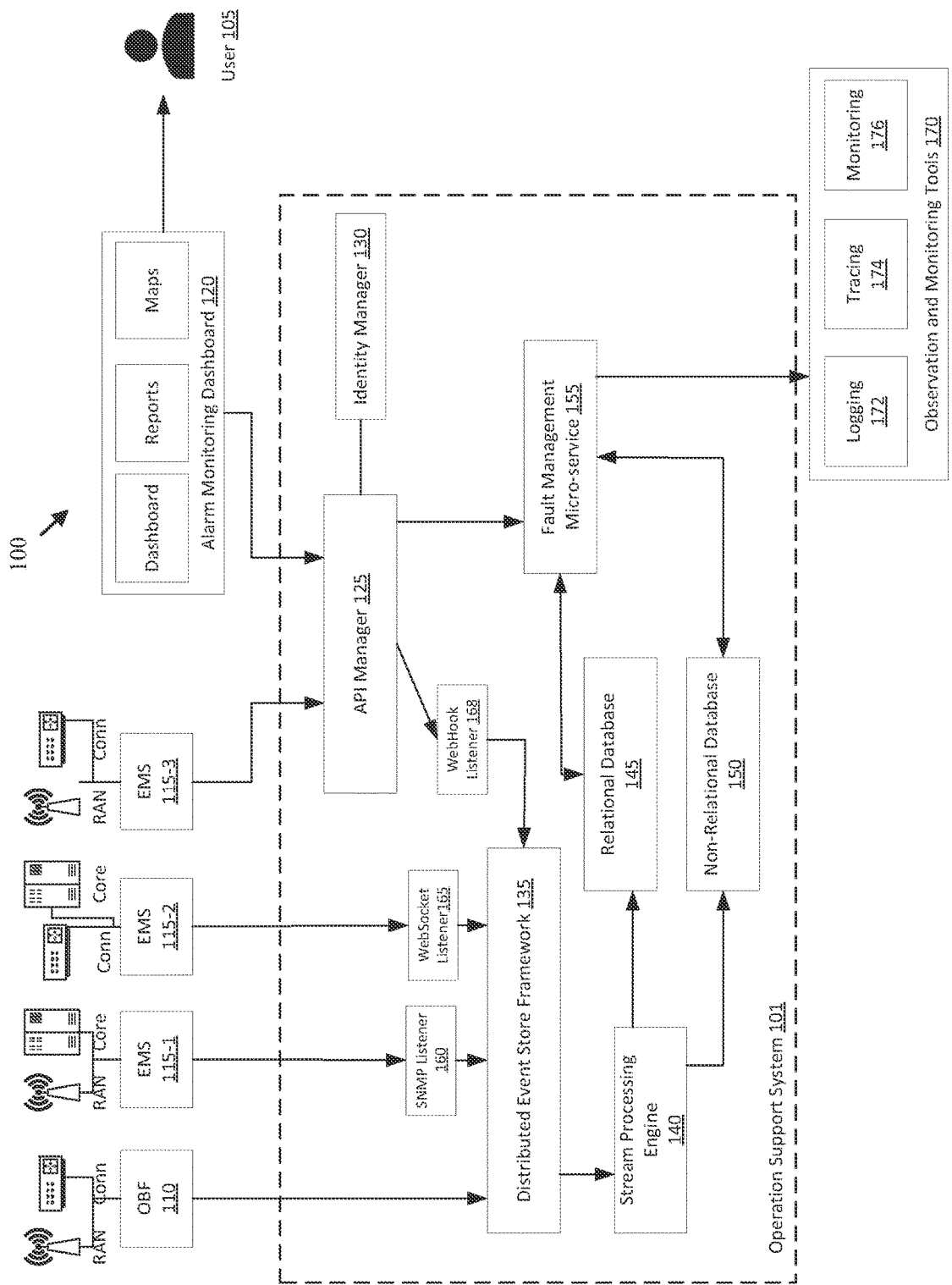
FIG. 1 is a diagram of a centralized fault monitoring and management system, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

Embodiments of the present disclosure are directed to a cloud native and protocol agnostic centralized fault monitoring and management method, system, and apparatus. Being protocol agnostic, the centralized fault monitoring and management system described herein can integrate a plurality of entity management systems (EMS) employing multiple different protocols, convert the alerts and faults into human readable format, and then display them on a fault monitor graphical user interface. Additionally, by being cloud native, embodiments of the present disclosure may easily incorporate containerized cloud-native applications such as data analytics tools, data science tools without being limited to a specific coding paradigm. As an example, embodiments of the present disclosure may leverage continuous event stream processing and/or distributed event storage, enabling the centralized fault monitoring and management system to become highly scalable and highly available for real-time processing of alerts in the telecommunication system.

The centralized fault monitoring and management system may include an operation support system (OSS), a plurality of observation and monitoring tools, an alarm monitoring dashboard, network elements and/or network devices, one or more observability frameworks, and one or more entity management systems. In embodiments of the present disclosure, the operation support system may include a load balancer, a plurality of listeners, application programming interface (API) manager, internal identity management system, fault management micro-service, a plurality of databases, a stream processing engine, and a distributed event store framework.

The OSS may be configured to receive, parse, monitor, and analyze the faults, events, and alerts received from one or more network devices in the telecommunication network. In some embodiments, the OSS may receive faults or alerts related to one or more network devices in the telecommunication network. Because network devices may be provided or provisioned by a plurality of vendors, the faults, events, or alerts may be communicated using vendor specific formats and codes or EMS specific protocols. The OSS may parse the faults, events, or alerts received to extract some relevant information and store the faults or alerts in a distributed event storage system and/or database. As an example, the OSS may identify the type of network element and/or the vendor associated with a network element, then add the type of network element to an inventory of network devices. The OSS may also add and/or register the alarm library for that type of network device or vendor to an alarm inventory and/or event inventory In addition to storing the faults or alerts in a distributed event storage system and/or database, the OSS may enrich the fault or alert information with additional contextual information using a continuous event streaming processor, for example, Spark® streaming. Enriching the fault information may include mapping a respective raw fault message from the raw fault messages to a specific network device from the one or more respective network devices based on the additional contextual information. As an example, the OSS may enrich the fault or alert information with network device ID, network device location, information about the alert from the inventory, etc. Based on the enrichment, the OSS may have a comprehensive idea of a fault or alert generated by a network device, with a relatively low data transmission overhead. The low data transmission overhead increases the efficiency of the telecommunication network and also increases the telecommunication network's capacity to process real-time fault information.

In some embodiments, a first subset of enriched information may be stored in a relational database and a second subset may be stored in a non-relational database for easier processing when analyzing or displaying fault, event, or alert information to a user. As an example, the OSS may store active or more recent alerts in a relational database and historical fault information in a non-relational database. A registered user may utilize a display GUI to retrieve, analyze, and generate reports about fault alerts in real time from the plurality of databases. The user may utilize one or more dashboards and analyze trends in fault occurrence.

In related art, fault management in telecommunication networks is not centralized. As an example, each vendor and each network protocol may have different processing pathways and databases. Essentially, in related art, there are disjointed processing streams for each protocol or vendor because of specific messaging format based on the protocol or the vendor. However, as telecommunication networks evolve, telecommunication networks provide more services and serve more customers, there is an increase in the protocols and vendors used. Related art with their static and distinct processing pathways do not scale well or are not as available as needed. Thus, there is need for a centralized fault monitoring and management system that is protocol agnostic and is highly scalable as the needs of the telecommunication network increase.

Additionally, telecommunication networks are increasingly leveraging cloud computing as telecommunication networks and devices evolve and many of the network functions performed by hardware components may now be performed by software components. With this increasing reliance on the cloud, a need for real-time, scalable, and available cloud native fault monitoring is essential to monitor any faults or alerts that arise within the telecommunication network. Therefore, a cloud-native protocol agnostic centralized fault monitoring and management tool is needed.

Embodiments of the present disclosure enable highly scalable fault monitoring and management of the telecommunication network with high efficiency and low data transmission overhead. As described herein, the OSS may enrich the fault or alert information using additional context information relating to the fault or alerts. In some embodiments, prior to the enrichment of the fault or alarm information, the OSS may register the type of network device generating the fault or alert information or register the alarm inventory of the type of network device generating the fault or alert information. Then, during the enrichment process, the OSS may refer to the inventory of registered devices and inventory of alarms to identify additional context information. Thus, the overhead data transfer for enriching the fault or alarm information is reduced because the OSS utilizes one or more inventories instead of requesting alarm or device specific information from vendors.

Embodiments of the present disclosure may enable reduced human involvement by providing centralized fault monitoring and management when unusual or time-sensitive events or alerts occur in the network. In addition, embodiments provide monitoring capability, where the network faults and any unusual activity may be flagged quickly and efficiently, enabling a quick resolution for the issues. This rapid resolution of issues may reduce the cost of network operations, provide faster troubleshooting, help significant incident avoidance, and increase user satisfaction.

FIG. 1 is a diagram of an overview of an embodiment described herein. As shown in FIG. 1, centralized fault monitoring and management system 100 may include an operation support system (OSS) 101, an observability framework (OBF) 110, a plurality of entity management systems (EMS) 115, an alarm monitoring dashboard 120, and observation and monitoring tools 170.

In some embodiments, the OSS 101 may include a distributed event store framework 135, a stream processing engine 140, one or more simple network management protocol (SNMP) listener 160, one or more websocket listener 165, one or more webhook listener 168, an application programing interface (API) manager 125, an identity manager 130, one or more relational database 145, one or more non-relational database 150, a fault management microservice 155, and one or more load balancers.

According to embodiments of the present disclosure, the OSS 101 may be configured to receive raw fault messages from one or more network elements or network devices in the telecommunication network. For example, the OSS 101 may receive raw fault messages from one or more base stations, radio access network devices, connection devices such as hubs, routers, user premise equipment, etc. In some embodiments, the OSS 101 may receive the raw fault messages via an EMS 115 or the OBF 110.

According to embodiments, each of these network devices may be associated with an EMS or an OBF. As an example, as shown in FIG. 1, some network devices may be associated with EMS 115-1, some with EMS 115-2, and so on. The plurality of EMS 115 may each have different communication protocols or different network protocols. The one or more network protocols include one or more of simple network management protocol (SNMP), a hypertext transfer protocol (HTTP/HTTPS), a transmission control protocol (TCP), an internet protocol (IP), or observability framework (OBF) protocols. In some embodiments, the network devices may have vendor specific message formats as well. In related art, there may be distinct processing pathways for each of the protocols, which makes the fault management system very bulky and non-scalable. However, in the present disclosure, the OSS may be protocol agnostic and receive raw fault messages in a plurality of protocols and/or formats and process each of the in a same processing pathway.

According to embodiments, the OSS may receive one or more raw fault messages in a plurality of protocols and/or formats from EMS 115 via listeners. As an example, a first raw fault message from the one or more raw fault messages may be received using a first network protocol from the one or more network protocols and a second raw fault message from the one or more raw fault messages may be received using a second network protocol from the one or more network protocols, and wherein the first network protocol is different than the second network protocol. According to embodiments, depending on the protocols used by a respective EMS, an SNMP listener 160, a websocket listener 165, or a webhook listener 168 may be used to receive raw fault messages.

According to an embodiment, an SNMP listener 160 may be used to receive raw fault messages from EMS 115-1. The SNMP listener 160 may capture and log SNMP traps. SNMP traps may be notices of events sent immediately to the OSS 101 from the network device or EMS 115-1 (usually without polling). Traps are an efficient way to receive error warning because an SNMP trap received at the OSS may indicate an emerging fault with a network device right away. In some embodiments, a load balancer may be used to balance load across the network devices prior to receiving receive raw fault messages from EMS 115-1 via the SNMP listener.

According to embodiments, the OSS 101 may receive raw fault messages from EMS 115-2 via a websocket listener 165. The websocket listener 165 may provide a bidirectional connection between the network devices or the EMS 115-2 and the OSS 101 that may be used to event based message passing without polling, for example, when a fault or error occurs.

According to embodiments, the OSS 101 may receive raw fault messages from EMS 115-3 via a webhook listener 168. The webhook listener 168 may provide a unidirectional connection between the network devices or EMS and the OSS and may contain event driver messages from the network device or EMS 115-3 to the OSS 101. In some embodiments, the EMS may use an API manager to transmit raw fault messages received from EMS to a webhook listener. The API manager may be used to verify a user's identity. As an example, the EMS 115-3 may use an API manager to transmit raw fault messages received from EMS 115-3 to the webhook listener 168, and the API manager may verify a user's identity and provide access control using an identity manager 130. The API manager may also enable communication between the fault management microservice 155 and the alarm monitoring dashboard 120 using microservices.

According to embodiments, the SNMP listener 160, the websocket listener 165, and the webhook listener 168 may monitor specific faults at the network device or the EMS 115 and when a fault occurs, they may communicate raw fault messages associated with those fault to the OSS 101. The SNMP listener 160, the websocket listener 165, and the webhook listener 168 may communicate with the OSS using a plurality of network protocols based on the EMS. In some embodiments, the raw fault messages may also be in vendor specific message format. As mentioned above, in related art, there may be distinct processing pathways for faults based on the vendor specific message format or the network protocol being used.

According to embodiments of the present disclosure, the OSS 101 may receive raw fault messages via the OBF 110. The OBF 110 may be configured to detect errors, faults, events, or alerts based on observing both inputs and outputs of the network devices and associated technology. The OBF 110 may use aggregation, analytics, automation, or artificial intelligence to detect errors, faults, events, or alerts in network devices. In some embodiments, the OBF 110 may use a specific programming language or framework (e.g., object oriented framework, language, or script) to transmit the one or more raw fault messages.

In some embodiments, the raw fault messages are received and stored at the distributed event store framework 135. In some embodiments, the distributed event store framework 135 may be a sequential single storage framework or database. In some embodiments, the distributed event store framework 135 may be customized to support continuous event processing or stream processing.

According to some embodiments, prior to or subsequent to storing the raw fault messages in the distributed event store framework 135, the raw fault messages may be parsed to identify fault information. The identification of fault information from raw fault messages may include an initial parsing of the raw fault message based on the network protocol or vendor specific message format. The parsing or identification of fault information may include integrating one or more network devices associated with the raw fault messages. Based on an initial parsing of the raw fault messages, one or more characteristics of the raw fault messages may be identified. Identified characteristics or fault information may include a type of the network device, an ID associated with the network device, an IP address associated with the network device, or a vendor associated with the network device. Based on the identified fault information, the type of network device may be determined and added to an inventory of network devices active in the telecommunication system. Additionally, in some embodiments, an alarm library associated with the type of network device or the vendor of the network device may be registered or added to an alarm inventory. The OSS 101 may receive the alarm library from a database or by communicating with a vendor server. In addition to the characteristics mentioned above, in some embodiments, fault information may also include a fault code. In-depth information associated with the fault may be retrieved from the alarm inventory. The alarm inventory may include information from the alarm library from the vendor or information from the alarm library associated with the type of network device. Exemplary information in the alarm library that may also be registered in the alarm inventory may include, the fault code, the fault classification, fault location, fault timing, fault criticality, or fault description. In some embodiments, the OSS 101 may parse a subset of the above fault information but may retrieve the rest from the vendor, the alarm inventory, the inventory of network devices, or its own databases. In some embodiments, the OSS may include a parser 620.

Subsequent to parsing and storing the raw fault messages, the fault information may be enriched by continuously processing the fault information and additional contextual information. The stream processing engine 140 may perform the continuous processing of the fault information and additional context information to enrich the fault information. In some embodiments, the additional contextual information may include at least one of a device status, a network domain, a geographic location, a radio-frequency cluster, a vendor id, or an entity management system id based on a device identification number. The additional contextual information may also include planned event information indicating outages or maintenance events in the telecommunication network.

Enriching the fault information may include mapping a respective raw fault message from the raw fault messages to a specific network device from the one or more respective network devices based on the additional contextual information. In some embodiments, enriching the fault information may include mapping the respective raw fault message from the raw fault messages to the specific network device from the one or more respective network devices and a specific alarm from the alarm inventory. Enriching the fault information by mapping additional contextual information to the fault information may provide a comprehensive idea or information about the fault, event, or alert generated by the network device. The user may use this comprehensive and mapped information to determine where the network device that raised the fault is, its location, the nature of the fault, etc. Having such comprehensive information in real-time will help monitor and respond to faults in the telecommunication network promptly.

An advantage of the embodiments described herein is that the additional contextual information may often include already stored information such as information from the alarm inventory, the inventory of network devices, etc. This reduces the transmission overhead associated with a raw fault message, and enables efficient and scalable processing of fault information in real-time.

According to embodiments of the present disclosure, the enriched fault information may then be stored in a plurality of databases. In some embodiments, a first subset of the enriched fault information may be stored in a first database and a second subset of the enriched fault information may be stored in a second database. As an example, a first subset of the enriched fault information may be stored in a relational database 145 and a second subset may be stored in a non-relational database 150. In some embodiments, the first subset may include enriched fault information relating to recent faults and the second subset may include enriched fault information relating to historical faults. According to embodiments, if enriched fault information stored relating to recent faults is stored in the first database longer than a history threshold, the first subset of the enriched fault information may be moved from the first database to the second database. According to some embodiments, the first subset may include enriched fault information relating to active faults or high priority faults and the second subset may include enriched fault information relating to resolved faults or low priority faults.

A user may retrieve, display, monitor, and analyze faults, events, or alerts generated in the telecommunication network using the alarm monitoring dashboard 120. In some embodiments, the alarm monitoring dashboard 120 may include display and/or a user interface that an authorized user 105 may use to view, retrieve, and analyze the faults and/or alarms generated in the telecommunication network. In some embodiments, the user 105 may customize the alarm monitoring dashboard 120 to generate historical dashboards, live dashboards, reports, or monitor and detect trends of fault occurrence in the telecommunication network or a subset of the telecommunication network. As an example, the alarm monitoring dashboard 120 may include controls that allow a user 105 to generate and/or display a user reports, dashboard representations, and geographical maps relating to recent or historical faults, active or resolved faults, sort faults based on priority, and analyze trends in fault occurrences based on artificial intelligence and machine learning. According to embodiments of the present disclosure, utilizing the stream processing engine 140 to continuously monitor and process real-time fault or alerts enables the user 105 to configure live dashboards of the fault occurrences in the telecommunication network. The continuous processing of real-time faults provides a scalable system that may handle situations where many faults occur, few faults occur, or anything in between. In some embodiments, the user 105 may customize the alarm monitoring dashboard 120 based on any of the above-mentioned features and/or information. In some embodiments, the fault management microservice 155 may retrieve enriched fault information from the plurality of databases and provide it to the alarm monitoring dashboard 120 using the API manager 125.

The central fault monitoring and management system disclosed herein may also include observation and monitoring tools 170. The observation and monitoring tools 170 may include methods and mechanisms to track, log, and monitor the overall performance of the central fault monitoring and management system 100. The observation and monitoring tools 170 may include a logging module 172, a tracing module 174, and a monitoring module 176. The logging module 172 may include a logging mechanism to record OSS activity. The tracing module 174 may include, a mechanism for monitoring and troubleshooting microservices in a distributed or cloud-based system. The monitoring module 176 may include, a mechanism for recoding and processing system metrics and timestamps.

Figure 2:
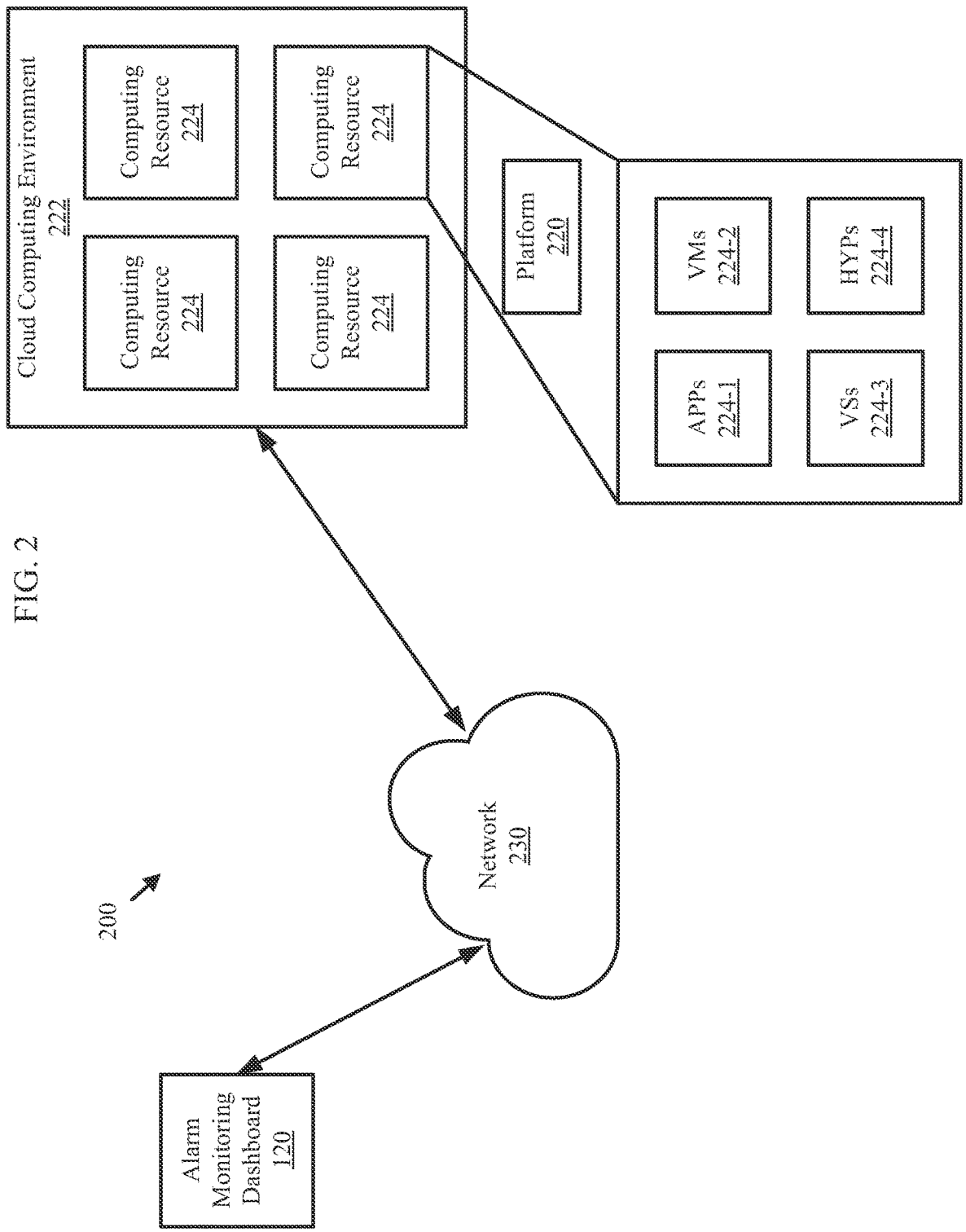
FIG. 2 is a diagram of an example environment in which systems and/or methods, described herein, may be implemented, according to embodiments.

FIG. 2 is a diagram of an example environment 200 in which systems and/or methods, described herein, may be implemented. As shown in FIG. 2, environment 200 may include an alarm monitoring dashboard 120, a platform 220, and a network 230. Devices of environment 200 may interconnect via wired connections, wireless connections, or a combination of wired and wireless connections. In embodiments, any of the functions of the elements included in network management system 100 may be performed by any combination of elements illustrated in FIG. 2.

Alarm monitoring dashboard 120 may include one or more devices capable of receiving, generating, storing, processing, and/or providing information associated with platform 220. For example, alarm monitoring dashboard 120 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the alarm monitoring dashboard 120 may receive information from and/or transmit information to platform 220.

Platform 220 may include one or more devices capable of integrated identity management and monitoring, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 may include an environment that hosts platform 220. Cloud computing environment 222 may provide computation, software, data access, storage, etc. services that do not require end-user (e.g., alarm monitoring dashboard 120) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 may include one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, virtualized storage ("VSs") 224-3, one or more hypervisors ("HYPs") 224-4, or the like. Application 224-1 may include one or more software applications that may be provided to or accessed by alarm monitoring dashboard 120. Application 224-1 may eliminate a need to install and execute the software applications on alarm monitoring dashboard 120. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 may include a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., alarm monitoring dashboard 120), and may manage infrastructure of cloud computing environment 222, such as data management, synchronization, or long-duration data transfers.

Virtualized storage 224-3 may include one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 may include one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to alarm monitoring dashboard 120 and/or platform 220. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable storage medium, along with a corresponding drive.

Input component 350 may include a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 may include a component that provides output information from device 300 (e.g., a display, a speaker, and/or one or more light-emitting diodes (LEDs)).

Communication interface 370 may include a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the modules or components of FIG. 1 may be implemented by or using any one of the elements illustrated in FIGS. 2-3.

Figure 4A:
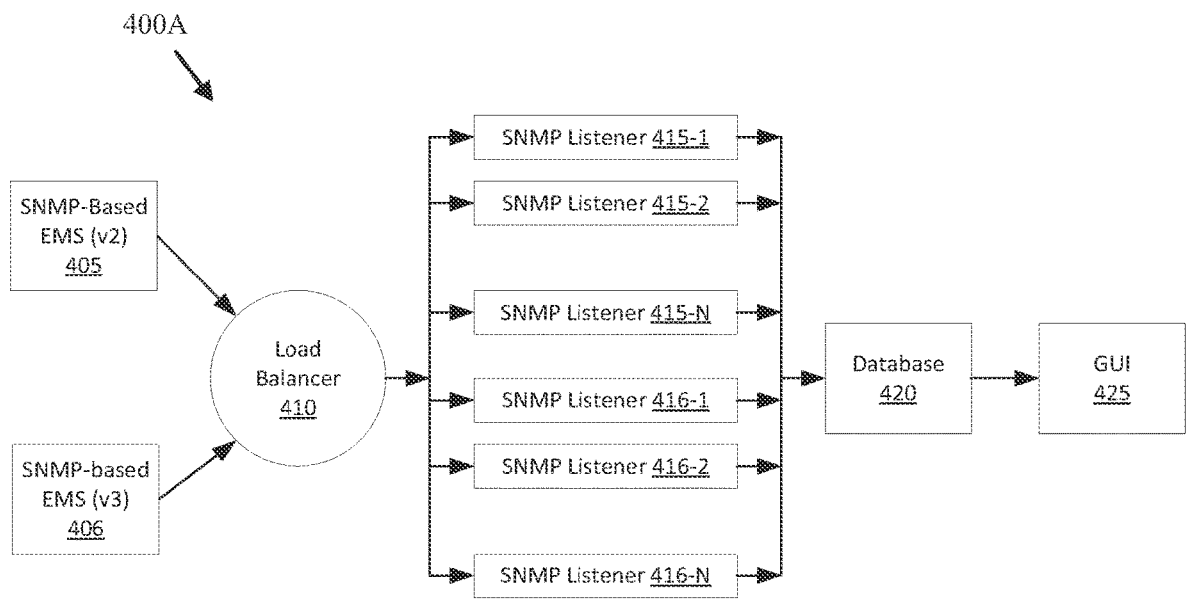
FIGS. 4A-C illustrate diagrams of an example process for fault monitoring using separate processing pathways in related art.
Figure 4B:
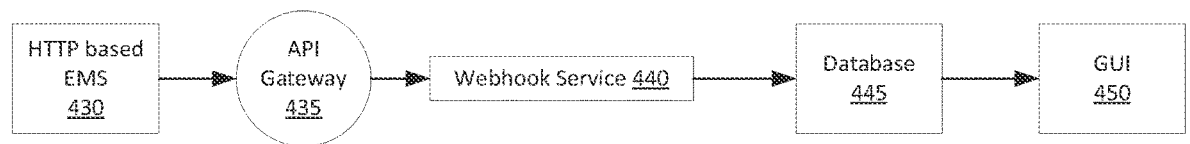
Figure 4C:

FIGS. 4A-C are diagrams illustrating separate processing pathways for fault monitoring in related art.

As seen in FIG. 4A, a processing pathway 400A is illustrated for processing faults received via SNMP based EMS 405 and 406. The SNMP listeners 415 and SNMP listeners 416 may receive raw fault messages via a load balancer 410. The SNMP listeners 415 may be configured to receive raw fault messages associated with the SNMP version 2. The SNMP listeners 416 may be configured to receive raw fault messages associated with the SNMP version 3. In related art, the raw fault messages may be parsed and stored in a database 420 which may store information related to faults generated using or communicated using the specific protocol such as SNMP. Further graphical user interface (GUI) 425 may display alerts associated with the fault information stored in database 420.

As seen in FIG. 4B, a processing pathway 400B is illustrated for processing vendor specific faults received via a webhook service 440 and API gateway 435. The webhook service 440 may receive raw fault messages over HTTPS using API gateway 435. In related art, the raw fault messages may be parsed and stored in a database 445 which may store information related to faults generated using or communicated using the specific protocol such as HTTPS or by a specific vendor. Further GUI 450 may display alerts associated with the fault information stored in database 445.

As seen in FIG. 4A, a processing pathway 400C is illustrated for processing vendor specific faults received via a websocket listener 460. The websocket listener 460 may receive raw fault messages over HTTPS or TCP/IP. In related art, the raw fault messages may be parsed and stored in a database 465 which may store information related to faults generated using or communicated using the specific protocol such as HTTPS or TCP/IP or by a specific vendor. Further GUI 470 may display alerts associated with the fault information stored in database 465.

As seen from FIGS. 4A-C, fault monitoring systems in related art that include separate processing pathways for each protocol or vendor result in a bulky, non-scalable, and inefficient fault monitoring and management system. However, FIG. 5 illustrates an embodiment of the present disclosure that provides a better fault monitoring and management system.

Figure 5:
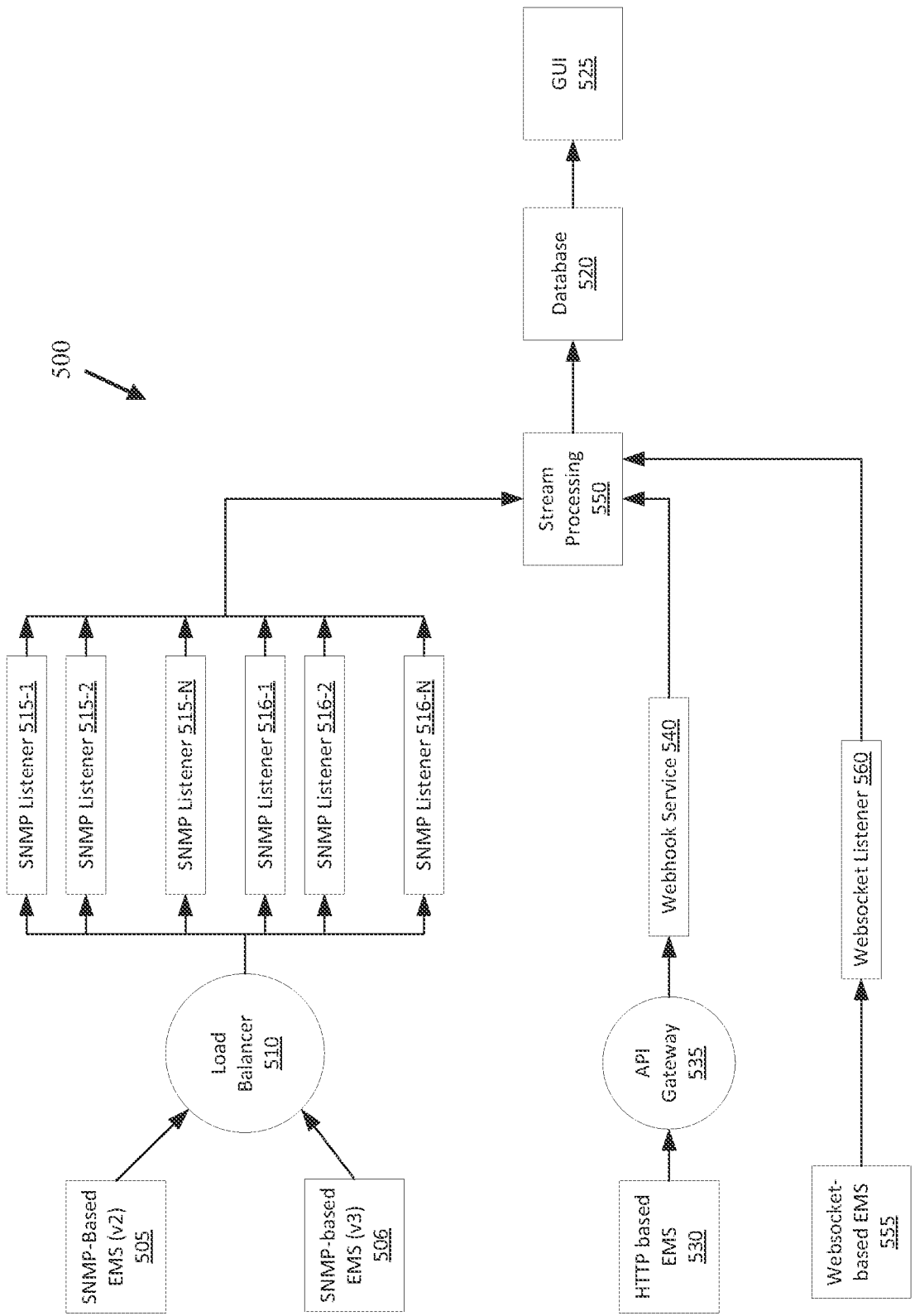
FIG. 5 illustrates a diagram of an exemplary process for centralized fault monitoring with single common pathway, according to embodiments.

FIG. 5 illustrates a diagram of an exemplary process 500 for centralized fault monitoring with single common pathway, according to embodiments. As shown in FIG. 5, even though a plurality of SNMP listeners 515 and 516, webhook service 540, and websocket listener 560 may be used to receive raw fault messages from a plurality of network devices and EMS (505, 506, 530, and 555) in the telecommunication network, stream processing 550 enables a single streaming job which runs different configurations based on the type of network device and/or the vendor associated with the network device. The single streaming job on stream processing 550 enables a continuous processing of raw fault information into useful and user understandable information relating to the faults. This processed, useful, and user understandable information is then stored in one or more database 520 and may be visualized by a user using GUI 525. Thus, the overall complexity of the fault monitoring and management system is reduced, efficiency increases, resources are better utilized, and the fault monitoring and management system becomes highly scalable.

Figure 6:
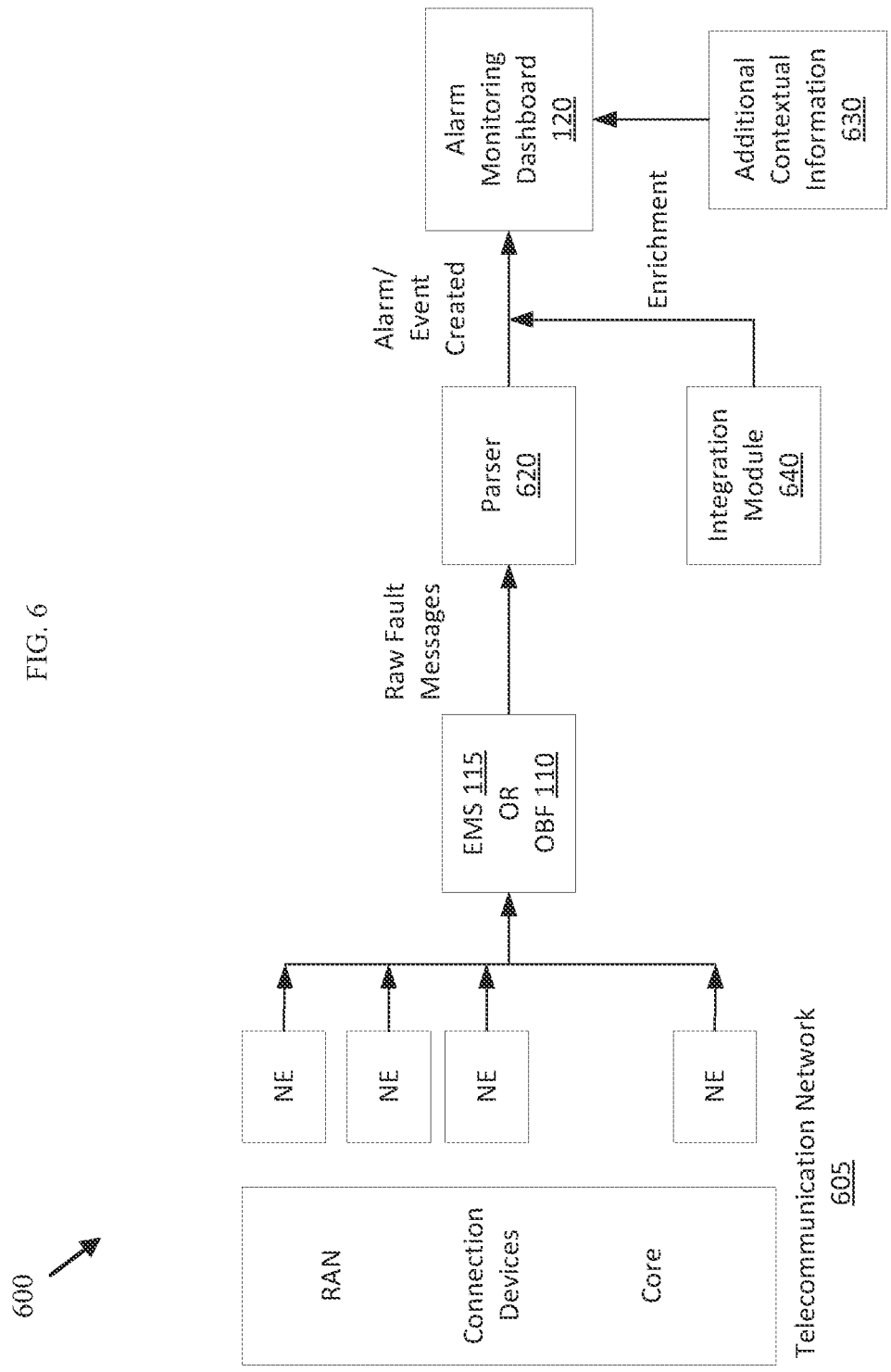
FIG. 6 illustrates a diagram of an example process for centralized fault monitoring and management system, according to embodiments.

FIG. 6 illustrates a diagram of an example process for centralized fault monitoring and management system, according to embodiments.

As shown in FIG. 6, the telecommunication network 605 may include radio access network (RANs) connection devices, network core, and a plurality of network devices or network elements (NE). EMS 115 or OBF 110 may receive raw fault messages or alerts generated by a network device or network element of the telecommunication network. The EMS 115 or OBF 110 may transmit the raw fault messages to a parser 620 for an initial parsing of fault information from the raw fault messages. The parser 620 may parse some fault information from the raw fault messages including identifying fault information from the raw fault messages. The identified fault information may include identifying at least one of a network device IP address, a network device identification number, a network device vendor ID, or a type of network device. The parser 620 may also integrate the network devices that generated the raw fault messages. Integration by an integration module 640 may include adding the type of network device to an inventory of network devices and registering an alarm library of the type of network device to an alarm inventory.

Then, the raw fault messages may be enriched. The enrichment may include mapping the respective raw fault message to a specific network device. In some embodiments, the enrichment may include mapping a respective raw fault message to a specific network device and a specific alarm from an alarm inventory. The enrichment may be performed using additional contextual information 630 including at least one of a device status, a network domain, a geographic location, a radio-frequency cluster, a vendor id, an entity management system id based on a device identification number, or planned event information indicating outages or maintenance events in the telecommunication network.

An alarm may be created from the enriched fault information. A user may retrieve, display, monitor, and analyze faults, events, or alerts generated in the telecommunication network using the alarm monitoring dashboard 120. In some embodiments, the alarm monitoring dashboard 120 may include display and/or a user interface that an authorized user may use to view, retrieve, and analyze the faults and/or alarms generated in the telecommunication network. In some embodiments, the user may customize the alarm monitoring dashboard 120 to generate historical dashboards, live dashboards, reports, or monitor and detect trends of fault occurrence in the telecommunication network or a subset of the telecommunication network.

As shown in FIG. 6, an exemplary process 600 for centralized fault monitoring and management system is illustrated, according to embodiments.

Figure 7:
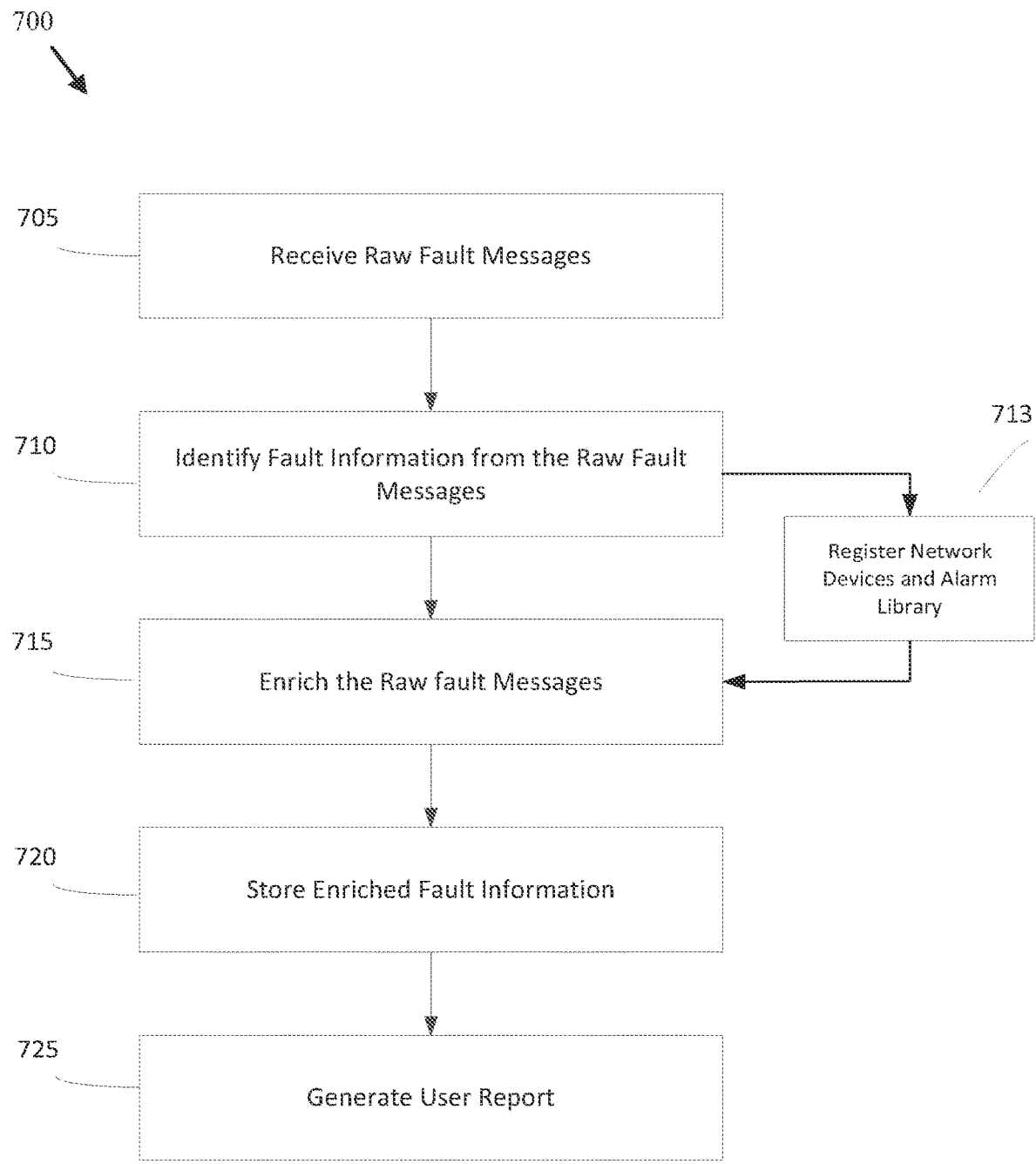
FIG. 7 is a flow chart of example processes for centralized fault monitoring and management, according to embodiments.

FIG. 7 is a flow chart of example processes for centralized fault monitoring, according to embodiments.

As shown in FIG. 7, process 700 may include receiving raw fault messages at operation 705. The fault monitoring and management system may receive raw fault messages associated with one or more respective network devices. The raw fault messages may be received using one or more network protocols, the one or more network protocols may be associated with the one or more respective network devices. As an example, the OSS 101 may receive raw fault messages from a EMS 115-1 and EMS 115-2, each EMS following a specific network protocol.

As shown in FIG. 7, process 700 may include identifying fault information from the raw fault messages at operation 710. According to embodiments, identified fault information may include at least one of a network device IP address, a network device identification number, a network device vendor ID, or a type of network device. Identifying fault information from the raw fault messages may include integrating the one or more respective network devices based on the identified fault information and storing the raw fault messages in an event storing framework for continuous stream processing. As an example, OSS 101 may identify an IP address associated with a network device that is issuing a fault message. The information associated with that network device may be integrated into the fault monitoring and management system. Then, the raw fault message may be stored at the distributed event store framework 135.

As shown in FIG. 7, process 700 may include registering network devices and registering alarm library at operation 713. In some embodiments, operation 713 may be optionally performed if a type of network device is not registered with the central fault monitoring or management system or if a network device is not active. At operation 713, the network device issuing the raw fault message may be identified an integrated. Integration may include determining a type of network device issuing the raw fault messages based on the identified fault information, adding the type of network device to an inventory of network devices, and registering the alarm library of the type of network device to an alarm inventory. Exemplary information that may be included in the alarm library and that may also be registered in the alarm inventory may include the fault code, the fault classification, fault location, fault timing, fault criticality, or fault description.

As shown in FIG. 7, process 700 may include enriching the raw fault messages at operation 715. Enriching the fault information may include continuously processing fault information and additional contextual information. Additional context information may include at least one of a device status, a network domain, a geographic location, a radio-frequency cluster, a vendor id, an entity management system id based on a device identification number, or planned event information indicating outages or maintenance events in the telecommunication network. According to embodiments, the enriching may include mapping a respective raw fault message to a specific network device. Enriching may also include mapping a respective raw fault message to a specific network device and a specific alarm from the alarm inventory. As an example, based on a fault code in a raw fault message being 01 and an IP address of the network device being 127.00.00.14, enriching the fault information may include combining or mapping alarm information from the alarm inventory associated with fault code 01 and information associated with network device at IP address 127.00.00.14 such as device type, vendor, etc., such that the fault monitoring and management system may have a comprehensive idea of the fault even though only the fault code and network device IP address is known.

As shown in FIG. 7, process 700 may include storing the enriched fault information at operation 720. The enriched fault information may be stored in parts in a plurality of databases. As an example, a first subset of the enriched fault information may be stored in a first relational database 145 and a second subset of the enriched fault information may be stored in a second non-relational database 150.

As shown in FIG. 7, process 700 may include generating user report at operation 725. A user may generate one or more user reports based on the enriched fault information in the plurality of databases, with the one or more user reports is one of a customizable dashboard, a trend report, or a map-based report.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations may include each dependent claim in combination with every other claim in the claim set.

Throughout this present disclosure, the terms "events," "alerts," "alarms," and "faults" may be used interchangeably. No element, act, or instruction used herein should be construed as critical or essential unless explicitly described as such. Also, as used herein, the articles "a" and "an" are intended to include one or more items, and may be used interchangeably with "one or more."

Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

What is claimed is:

1. A method for cloud-native centralized fault monitoring in a telecommunication network, the method executed by one or more processors in an operation support system of the telecommunication network, the method comprising:

receiving one or more raw fault messages associated with one or more respective network devices, wherein the one or more raw fault messages are received using one or more network protocols associated with the one or more respective network devices;

identifying fault information from the one or more raw fault messages;
enriching the fault information based on continuously processing the fault information and additional contextual information; and
storing the enriched fault information in a plurality of databases, wherein a first subset of the enriched fault information is stored in a first database and a second subset of the enriched fault information is stored in a second database,
wherein the first subset of the enriched fault information includes recent fault event information, wherein the second subset of the enriched fault information includes historical fault event information, wherein the first database is a relational database, and wherein the second database is a non-relational database.

2. The method of claim 1, wherein the identifying the fault information comprises:
integrating the one or more respective network devices; and
storing the one or more raw fault messages in an event storing framework for continuous stream processing.

3. The method of claim 2, wherein the integrating comprises:
determining a type of network device based on the identified fault information;
adding the type of network device to an inventory of network devices; and
registering an alarm library of the type of network device to an alarm inventory.

4. The method of claim 2, wherein the identified fault information includes at least one of a network device IP address, a network device identification number, a network device vendor ID, or a type of network device.

5. The method of claim 1, wherein the additional contextual information includes:
at least one of a device status, a network domain, a geographic location, a radio-frequency cluster, a vendor id, or an entity management system id based on a device identification number; and
planned event information indicating outages or maintenance events in the telecommunication network.

6. The method of claim 5, wherein the enriching comprises at least one of:
mapping a respective raw fault message from the one or more raw fault messages to a specific network device from the one or more respective network devices; or
mapping the respective raw fault message from the one or more raw fault messages to the specific network device from the one or more respective network devices and a specific alarm from an alarm inventory.

7. The method of claim 1, further comprising:
generating one or more user reports based on the first subset of the enriched fault information and the second subset of the enriched fault information, wherein the one or more user reports is one of a customizable dashboard, a trend report, or a map-based report.

8. The method of claim 2, wherein a first raw fault message from the one or more raw fault messages is received using a first network protocol from the one or more network protocols and a second raw fault message from the one or more raw fault messages is received using a second network protocol from the one or more network protocols, and wherein the first network protocol is different than the second network protocol.

9. The method of claim 1, wherein the one or more raw fault messages associated with the one or more respective network devices are received via one or more entity management systems.

10. The method of claim 9, wherein the first database is organized based on vendor ID and entity management system ID.

11. The method of claim 1, further comprising:
based on the first subset of the enriched fault information being stored in the first database longer than a history threshold, moving the first subset of the enriched fault information from the first database to the second database.

12. An apparatus for cloud-native centralized fault monitoring in a telecommunication network, the apparatus comprising:
a memory configured to store instructions; and
one or more processors configured to execute the instructions to:
receive one or more raw fault messages associated with one or more respective network devices, wherein the one or more raw fault messages are received using one or more network protocols associated with the one or more respective network devices;
identify fault information from the one or more raw fault messages;
enrich the fault information based on continuously processing the fault information and additional contextual information; and
store the enriched fault information in a plurality of databases, wherein a first subset of the enriched fault information is stored in a first database and a second subset of the enriched fault information is stored in a second database,
wherein the first subset of the enriched fault information includes recent fault event information, wherein the second subset of the enriched fault information includes historical fault event information, wherein the first database is a relational database, and wherein the second database is a non-relational database.

13. The apparatus of claim 12, wherein the identifying the fault information comprises:
integrating the one or more respective network devices; and
storing the one or more raw fault messages in an event storing framework for continuous stream processing.

14. The apparatus of claim 13, wherein the integrating comprises:
determining a type of network device based on the identified fault information;
adding the type of network device to an inventory of network devices; and
registering an alarm library of the type of network device to an alarm inventory.

15. The apparatus of claim 12, wherein the one or more processors are further configured to execute the instructions to:
generate one or more user reports based on the first subset of the enriched fault information and the second subset of the enriched fault information, wherein the one or more user reports is one of a customizable dashboard, a trend report, or a map-based report.

16. A non-transitory computer-readable medium storing instructions, the instructions comprising: one or more instructions that, when executed by one or more processors of a cloud-native centralized fault monitoring in a telecommunication network, cause the one or more processors to:

receive one or more raw fault messages associated with one or more respective network devices, wherein the one or more raw fault messages are received using one or more network protocols associated with the one or more respective network devices;

identify fault information from the one or more raw fault messages;

enrich the fault information based on continuously processing the fault information and additional contextual information; and store the enriched fault information in a plurality of databases, wherein a first subset of the enriched fault information is stored in a first database and a second subset of the enriched fault information is stored in a second database, wherein the first subset of the enriched fault information includes recent fault event information, wherein the second subset of the enriched fault information includes historical fault event information, wherein the first database is a relational database, and wherein the second database is a non-relational database.

17. The non-transitory computer-readable medium of claim 16, wherein the additional contextual information includes:

at least one of a device status, a network domain, a geographic location, a radio-frequency cluster, a vendor id, or an entity management system id based on a device identification number; and planned event information indicating outages or maintenance events in the telecommunication network.

18. The non-transitory computer-readable medium of claim 17, wherein the enriching comprises at least one of:

mapping a respective raw fault message from the one or more raw fault messages to a specific network device from the one or more respective network devices; or mapping the respective raw fault message from the one or more raw fault messages to the specific network device from the one or more respective network devices and a specific alarm from an alarm inventory.

* * * * *